No. 842,623. PATENTED JAN. 29, 1907.
F. L. CARRELL.
CULTIVATOR.
APPLICATION FILED SEPT. 8, 1905.
2 SHEETS—SHEET 1.
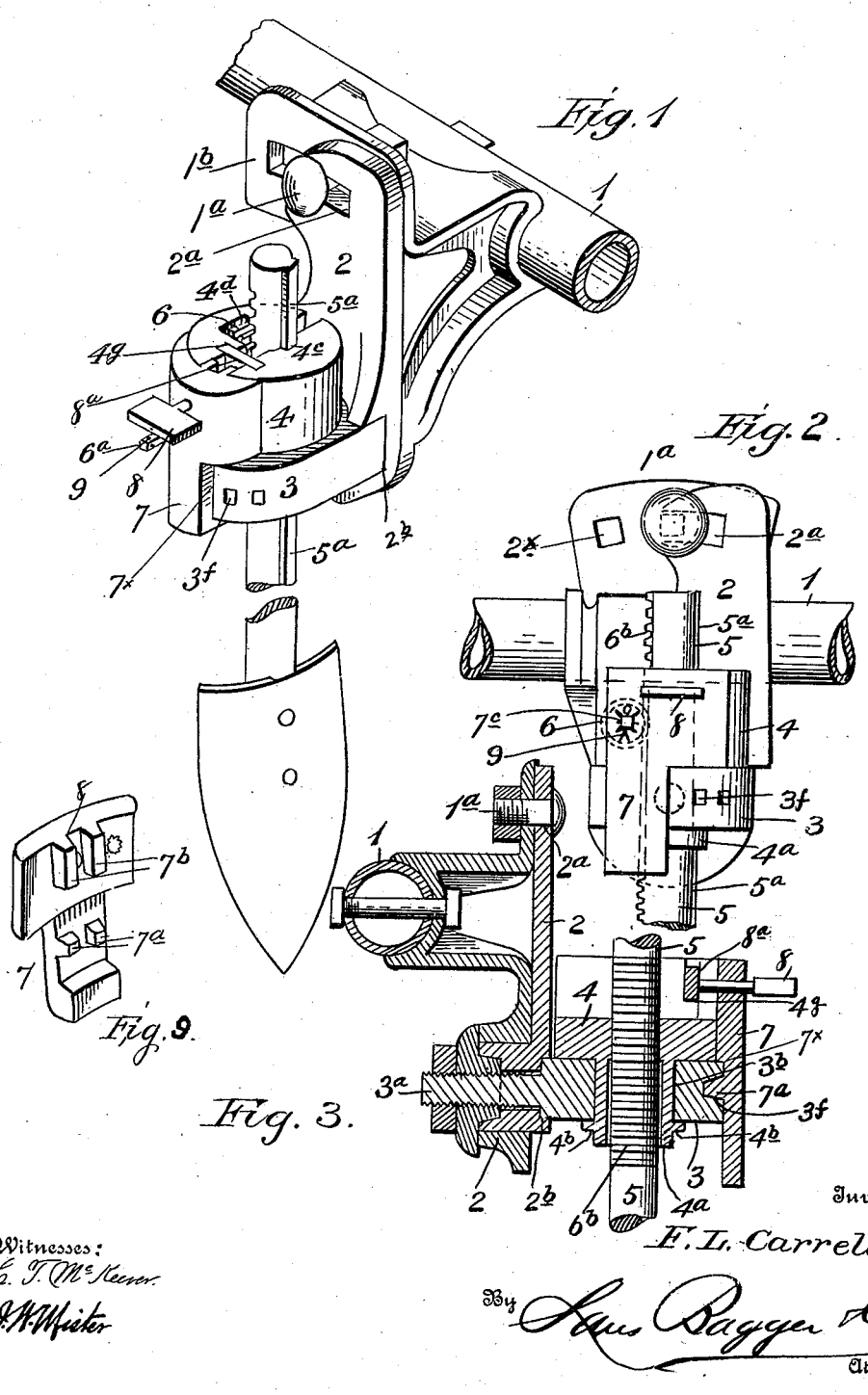
Witnesses:
H. T. McKenn.
J. W. Meister.
Inventor:
F. L. Carrell,
By Sans Bagger & Co.
Attorneys

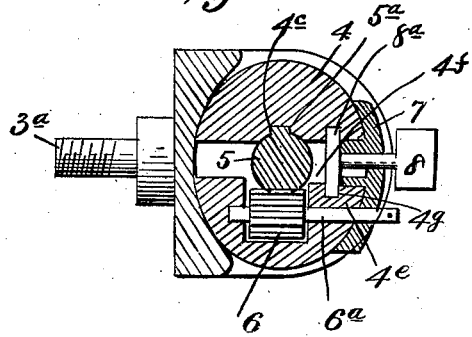
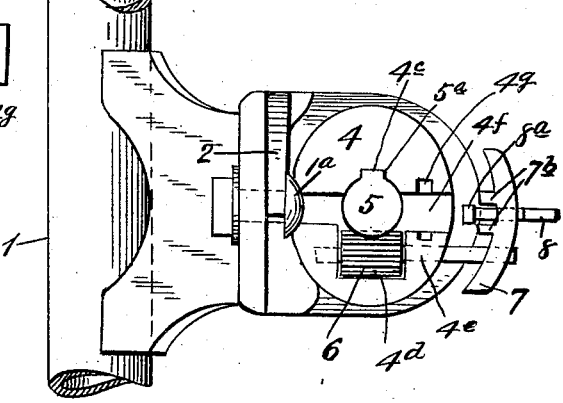
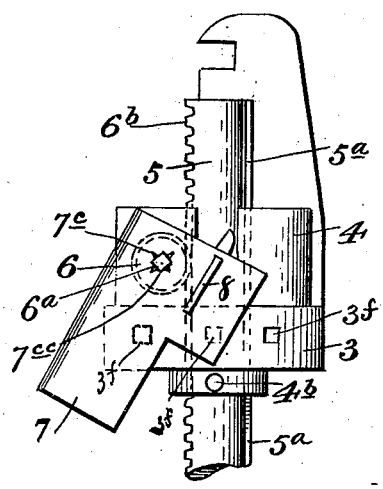
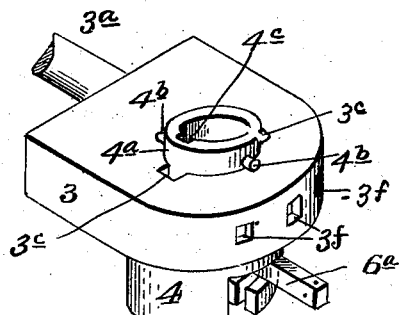
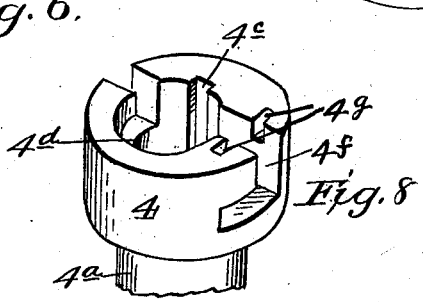

UNITED STATES PATENT OFFICE.

FITZHU L. CARRELL, OF GRANGER, TEXAS.

CULTIVATOR.

No. 842,623.            Specification of Letters Patent.            Patented Jan. 29, 1907.

Application filed September 8, 1905. Serial No. 277,497.

*To all whom it may concern:*

Be it known that I, FITZHU L. CARRELL, a citizen of the United States, residing at Granger, in the county of Williamson and State of Texas, have invented new and useful Improvements in Cultivators, of which the following is a specification.

My invention relates to improvements in cultivators.

Among other objects of the invention it is noticed that provision is made for effecting the vertical adjustment of the plow or shovel standard for varying the depth of plowing, also for the turning or horizontal movement thereof for its angular adjustment, together with the plow or shovel, for permitting the yielding or deflecting of the plow or shovel standard in event of the contact of the shovel or plow with an unyielding obstruction, and for carrying out these purposes in a simple, economic, and effective manner.

Said invention consists of structural features substantially as hereinafter fully disclosed, and particularly pointed out by the claims.

In the accompanying drawings, illustrating the preferred embodiment of my invention, Figure 1 is a broken or fragmentary view of certain portions of a cultivator embracing the invention. Fig. 2 is a side elevation thereof. Fig. 3 is a vertical section produced through the device at right angles to the line of draft. Fig. 4 is a horizontal section taken upon a line extending through the plow-standard, its receiving collar or sleeve member, and centrally through the pinion for engaging or adjusting the said standard, &c. Fig. 5 is a plan view of the invention. Fig. 6 is also a side view showing more particularly the horizontally-adjusting and holding contrivance disposed as when it may be employed as a winch for actuating the plow-standard adjusting-pinion. Fig. 7 is a detached perspective view of the part adjunctive of the plow-standard angular adjusting contrivance or means, viewing the same at an angle exposing the bottom surface of said part. Fig. 8 is a detached like view of the plow-standard-receiving sleeve or collar viewing the same at an angle exposing the interior axial groove thereof for the reception of the plow-standard retaining rib or spline. Fig. 9 is a detached inside view of the holding device or dog for the cultivator-shovel-standard collar or sleeve.

In the carrying out my invention I equip a beam 1 or beams of a cultivator or plow of approved or other form with an upstanding bracket 2, which is preferably of the general outline shown and has in its rear edge, near the extreme upper end, a rearward-opening slot $2^a$, receiving a securing-bolt $1^a$, with which an adjunctive part or offset $1^b$ of the beam 1 is provided to hold that end of said bracket 2 in place. A hole $2^x$ is provided in said offset in addition to the one occupied by the bolt $1^a$ for the adjustment of the position of said bolt, accordingly permitting of changing the inclination of said bracket, together with that of the cultivator-shovel standard, as will be readily understood. The more especial function of the slot $2^a$ is to provide for the release of the upper end of the bracket from its holding or securing bolt $1^a$ when the plow or shovel should come into contact with an unyielding obstruction, as a tree-root, boulder, or other obstacle, as will be appreciated by those familiar with agricultural pursuits. Said bracket has outstanding at right angles or horizontally therefrom an arm 3 or adjunctive part thereof, the inner end of which is let into a continuous recess or mortise $2^b$, produced in the outer surface of the bracket 2 near its lower end. Said arm has extending centrally from its inner end a screw-threaded pivot-bolt extension $3^a$, passing through and nut-secured to the offset or adjunctive part $1^b$ of the cultivator-beam. Said bolt formation or extension thus combines with the recess or mortise $2^b$ to hold the arm and bracket intact, particularly when the bolt serves as a pivot, which it does when the upper end of said bracket is released, as aforesaid.

A stepped sleeve or collar 4, having its less-diametered lower end portion $4^a$ inserted and passed through an opening $3^b$ in the arm 3, is thus supported upon and permitted to be turned horizontally in said arm, the lower end portion of said sleeve being provided with lugs $4^b$, resting below and upon the under side of said arm to prevent the accidental upward displacement of said sleeve or collar. Said sleeve or collar may be readily inserted and withdrawn from the arm 3 as occasion may require, opposite axial or vertical recesses or slots $3^c$ being provided in the walls of the opening $3^b$ of said arm for the passage of the lugs $4^b$ therethrough for that purpose.

A shovel or plow standard 5, of preferably general cylindric outline and suitably equipped with a plow or shovel of the required type, is passed through the sleeve or collar 4 and carried thereby and has an axial spline-like rib or extension $5^a$ arranged, preferably, along its front surface and received within a corresponding groove $4^c$, traversing the wall of said sleeve, to hold the plow-standard against turning in the latter, and yet permit axial or vertical movement of the standard, as in effecting the corresponding adjustment thereof for plowing shallow or deep, as well understood.

A preferably trundle-like pinion 6, arranged in a chamber $4^d$ of the enlarged or upper portion of the sleeve 4 and having its shaft $6^a$ extending through suitable openings or bearings $4^e$ in the sleeve or collar, is effective to mesh with or engage cogs or teeth $6^b$, with which the plow or shovel standard is equipped, to provide for conveniently effecting the vertical adjustment of said standard. The shaft of said pinion projects suitably beyond the sleeve or collar 4 for the application thereto of means for its ready actuation, together with the pinion, as will be seen presently.

A holding contrivance 7, applied to the sleeve or collar 4, is of an outline to adapt it to conveniently serve somewhat after the manner of a dog or detent for the retention of said sleeve or collar at the required point of horizontal adjustment, as in angularly disposing the plow-standard for requisitely throwing the dirt to and from the plants and for varying the amount of dirt thus thrown. The dog or holding device aforesaid, having one arm opposed to the periphery of the enlarged portion of the sleeve or collar 4 and its other arm member extending downward laterally of and close to the outer edge of the arm 3, has its latter arm member provided with preferably two teeth or projections $7^a$, set inward within a recess or mortise $7^x$ in the inner surface of said dog or holding device. The mortise, it will be noted, is thus adapted to receive the edge of the arm 3 to enable the seating of the dog or holding device thereon and the teeth or projections to enter or engage two of a series of corresponding notches $3^f$, produced in said edge of the arm, to any other one or more of which notches said teeth may be adjusted, accordingly providing for the horizontal adjustment of the sleeve with the plow-standard and the consequent angular disposing of the plow or shovel, as aforesaid. The upper arm member of the dog or holding device has upon its inner surface parallel suitably-spaced-apart ribs $7^b$, which are received snugly within a slot $4^f$, opening through the collar or sleeve 4 into the chamber $4^d$ of the latter. Said dog or holding device is also equipped with a finger-piece-ended latch or "button" 8, having its stem passing through an aperture therein and between the ribs $7^b$. Said stem has its extreme inner end provided with a cross-piece or button $8^a$, effective by actuating said latch to be turned into lateral recesses or slots $4^g$, formed in the sleeve or collar, for suitably fixing or holding the device or dog to said sleeve or collar and its teeth in locked position in connection with the arm 3 aforesaid. Of course by suitably turning or manipulating the latch the holding device or dog may be readily released for shifting its position, as in horizontally adjusting the shovel-standard. It will be noted that the dog or holding device 7 has an angular opening $7^c$ in its upper arm member for the reception and passage therethrough of the corresponding projecting end portion of the shaft of the pinion 6 and that by releasing said dog or holding contrivance from the sleeve or collar 4 and arm 3 and by turning it in connection with the pinion-shaft the pinion may be suitably actuated to raise or lower the shovel-standard as required in accordingly adjusting the latter. The walls of the opening $7^c$ of the dog or winch 7 are also notched intermediately of the corner edges thereof, as at $7^{cc}$, for manifolding the gripping or engaging points therebetween and the pinion-shaft, the purpose of which is apparent.

A pin or key 9 is inserted through the desired one of a number of transverse apertures or passages $6^c$, formed in the pinion-shaft projecting end portion, for the more effective retention of the pinion and its shaft at the required point of elevation or depression, as the case may be, as will be readily appreciated.

I claim—

1. A cultivator having a standard, a sleeve carrying said standard, a pinion arranged within said sleeve and geared to said standard, a bracket-arm support for said sleeve, and a dog effective for engagement with said sleeve, said bracket-arm support and the shaft of said pinion adapted to serve for actuating said pinion.

2. A cultivator having a standard equipped with teeth, a sleeve carrying said standard, a bracket-arm support for said sleeve, a pinion meshing with said teeth and arranged within said sleeve, and a dog applied to said sleeve and to the shaft of said pinion and having projections engaging notches in said bracket-arm support, whereby said dog is adapted to effect either the turning of said sleeve or the actuation of said pinion.

3. A cultivator having a standard equipped with teeth, a sleeve carrying said standard, a pinion hung in said sleeve and meshing with said teeth, a bracket-arm support for said sleeve, a dog equipped with a key for its retention in said sleeve, said dog being applied to the shaft of said pinion and adapted to adjustably engage said bracket-arm support for the purposes aforesaid.

4. A cultivator having a standard equipped with teeth, a sleeve carrying said standard, a pinion carried by said sleeve and meshing with said teeth, a bracket-arm support for said sleeve, and a dog having spaced-apart studs let into an entrance-slot of said sleeve, and a key or button with its shank passed through said dog, and between said studs, and its inner end cross-bar engaging recesses indenting the walls of said entrance-slot, said dog being applied to the shaft of said pinion and having projections engaging notches in said bracket-arm.

5. A cultivator comprising a vertically-adjustable standard, it being equipped with teeth, a bracket applied to a beam of the plow or cultivator, a horizontally-turning sleeve having said standard passing therethrough and its lower portion passing through an opening in an arm of said bracket, a pinion hung within said sleeve, and a dog having an angular aperture therein receiving an angular projecting portion of the shaft of said pinion, said dog having projections engaging notches provided in said arm of the bracket.

6. A cultivator, comprising a bracket equipped with an arm having a plurality of adjusting-notches, means for effecting connection between said bracket and a beam of the cultivator, a shovel-standard, a sleeve rotatably seated in said arm and carrying said standard, and a dog equipped with means for its connection to said sleeve and with a projection for engagement with the notches of said arm.

7. A cultivator, comprising a shovel-standard, a sleeve adapted to receive said standard, a bracket having an arm into which said sleeve is seated so as to have horizontal movement, means for the attachment of said bracket to a beam of the cultivator, and a dog equipped with a projection engaging notches in the outer edge of said arm and with a latch effective for engagement with said sleeve and having a manipulating finger member.

8. A cultivator, comprising a shovel-standard capable of vertical movement, a sleeve for receiving said standard, means for supporting said sleeve in position, a pinion for aiding the movement of said standard and having its shaft provided with an angular extension, and a dog for said sleeve, having an angular opening for receiving said angular shaft extension and effective for use in connection therewith.

In testimony whereof I affix my signature in presence of two subscribing witnesses.

FITZHU L. CARRELL.

Witnesses:
H. C. COOKE,
J. W. JACKSON.